US008043063B2

(12) United States Patent
Kelly et al.

(10) Patent No.: US 8,043,063 B2
(45) Date of Patent: Oct. 25, 2011

(54) INTENTIONALLY MISTUNED INTEGRALLY BLADED ROTOR

(75) Inventors: Frank Kelly, Oakville (CA); Kari Heikurinen, Oakville (CA); Edward Fazari, Etobicoke (CA); Yuhua Wu, Brampton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 412 days.

(21) Appl. No.: 12/411,644

(22) Filed: Mar. 26, 2009

(65) Prior Publication Data

US 2010/0247310 A1 Sep. 30, 2010

(51) Int. Cl.
*F01D 5/14* (2006.01)
*F03D 11/02* (2006.01)
*F04D 29/38* (2006.01)

(52) U.S. Cl. ......... 416/203; 416/234; 416/500; 415/119

(58) Field of Classification Search .................. 415/119, 415/208.3; 416/61, 144, 175, 203, 223 A, 416/228, 234, 243, 500
See application file for complete search history.

(56) References Cited

U.S. PATENT DOCUMENTS

| | | | |
|---|---|---|---|
| 2,870,958 A | 1/1959 | Pinsley | |
| 3,536,417 A | 10/1970 | Stiefel et al. | |
| 4,097,192 A | 6/1978 | Kulina | |
| 4,732,532 A | 3/1988 | Schwaller et al. | |
| 4,878,810 A | 11/1989 | Evans | |
| 5,286,168 A | 2/1994 | Smith | |
| 5,478,205 A | 12/1995 | Chou et al. | |
| 5,524,341 A | 6/1996 | Ferleger et al. | |
| 5,667,361 A | 9/1997 | Yaeger et al. | |
| 6,042,338 A | 3/2000 | Brafford et al. | |
| 6,379,112 B1 | 4/2002 | Montgomery | |
| 6,428,278 B1 | 8/2002 | Montgomery et al. | |
| 6,471,482 B2 | 10/2002 | Montgomery et al. | |
| 6,719,530 B2 | 4/2004 | Chow | |
| 6,854,959 B2 | 2/2005 | Barb | |
| 7,147,437 B2 | 12/2006 | Burdgick et al. | |
| 7,500,299 B2 * | 3/2009 | Dupeux et al. | 29/407.07 |

* cited by examiner

*Primary Examiner* — Asok Sarkar
(74) *Attorney, Agent, or Firm* — Norton Rose OR LLP

(57) ABSTRACT

A frequency mistuned integrally bladed rotor (IBR) for a gas turbine engine comprises a hub and a circumferential row of blades of varying frequency projecting integrally from the hub. Each blade in the row alternate with another blade having a different pressure surface definition but similar suction surface, leading edge and trailing edge definitions.

13 Claims, 3 Drawing Sheets

INTENTIONALLY MISTUNED INTEGRALLY BLADED ROTOR

TECHNICAL FIELD

The application relates generally to gas turbine engines and, more particularly, to a frequency mistuned integrally bladed rotor (IBR).

BACKGROUND OF THE ART

Integrally bladed rotors (IBR), also known as blisks, comprises a circumferential row of blades integrally formed in the periphery of a hub. The blades in the row are typically machined such as to have the same airfoil shape. However, it has been found that the uniformity between the blades increases flutter susceptibility. Flutter may occur when two or more adjacent blades in a blade row vibrate at a frequency close to their natural vibration frequency and the vibration motion between the adjacent blades is substantially in phase.

One solution proposed in the past to avoid flutter instability is to mistune the IBR by cropping the leading edge tip of some of the blades around the hub. However, this solution is not fully satisfactory from an aerodynamic and a manufacturing point of view.

Accordingly, there is a need to provide a new frequency mistuning method suited for integrally bladed rotors.

SUMMARY

It is therefore an object to provide an integrally bladed rotor (IBR) for a gas turbine engine, comprises a hub and a circumferential row of blades projecting integrally from said hub, the row including an even number of blades alternating between blades having first and second airfoil definitions around the hub, each blade having a pressure side and a suction side disposed on opposed sides of a median axis and extending between a trailing edge and a leading edge, the first and second airfoil definitions being different and having respective pressure side thicknesses T1 and T2 defined between respective median axes and respective pressure sides of the blades, the pressure side thickness T1 of the first airfoil definition being greater than the pressure side thickness T2 of the second airfoil definition.

In another aspect, there is provided a frequency mistuned integrally bladed rotor (IBR) for a gas turbine engine, comprising a hub and a circumferential row of blades of varying frequency projecting integrally from the hub, the row including an even number of blades, each blade in the row alternate with another blade having a different pressure surface definition but substantially identical suction surface, leading edge and trailing edge definitions.

In a third aspect, there is provided a method of reducing vibration in an gas turbine engine integrally bladed rotor (IBR) having a circumferential row of blades extending integrally from a hub, the circumferential row of blades comprising an even number of blades; the method comprising varying the natural frequency of the blades around the hub in an alternate pattern by providing first and second distinct airfoil profiles around the hub, the first and second profiles having similar suction side, leading edge and trailing edge profiles but a different pressure side profile.

DESCRIPTION OF THE DRAWINGS

Reference is now made to the accompanying figures, in which.

DETAILED DESCRIPTION

Figure 1:
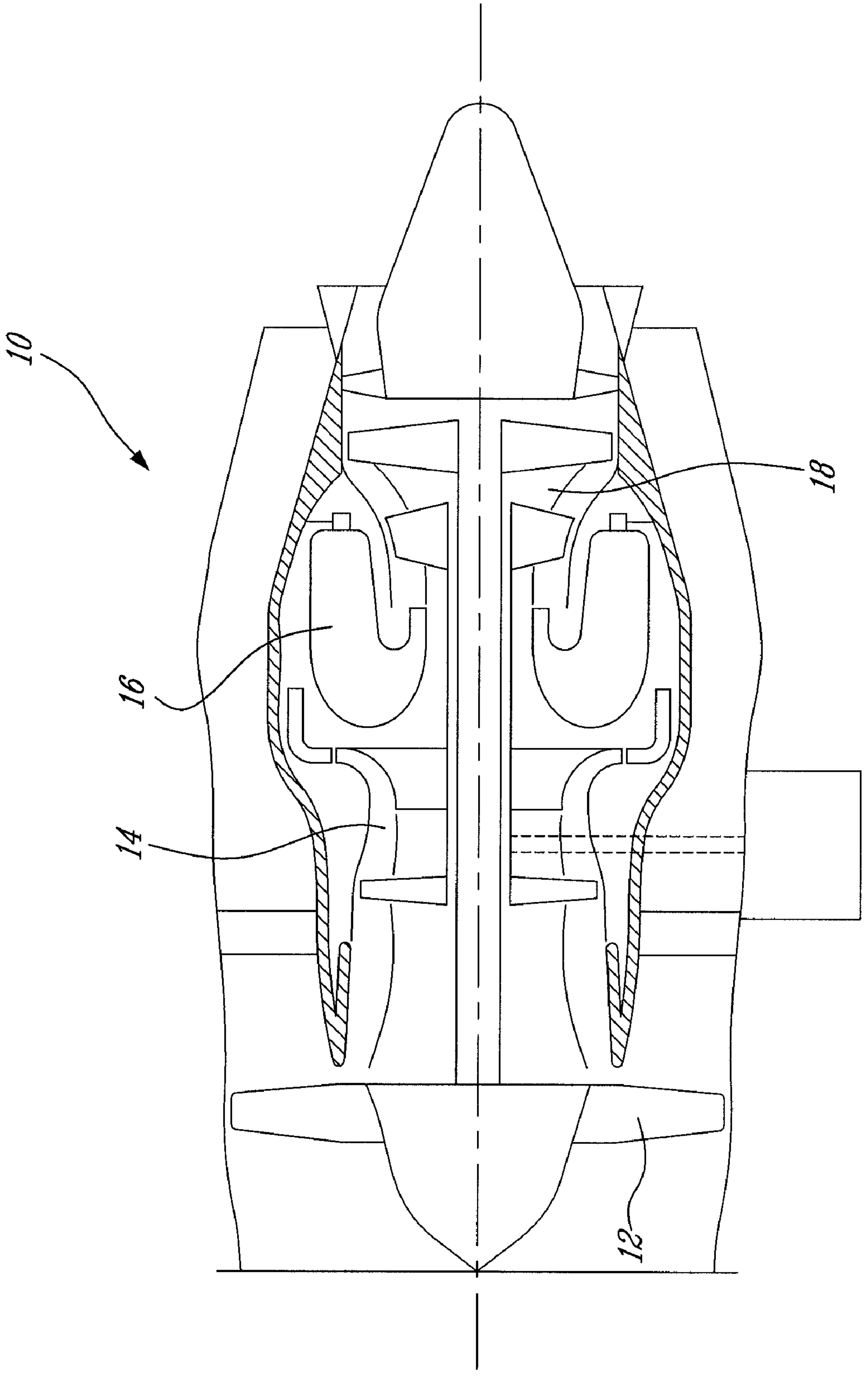
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
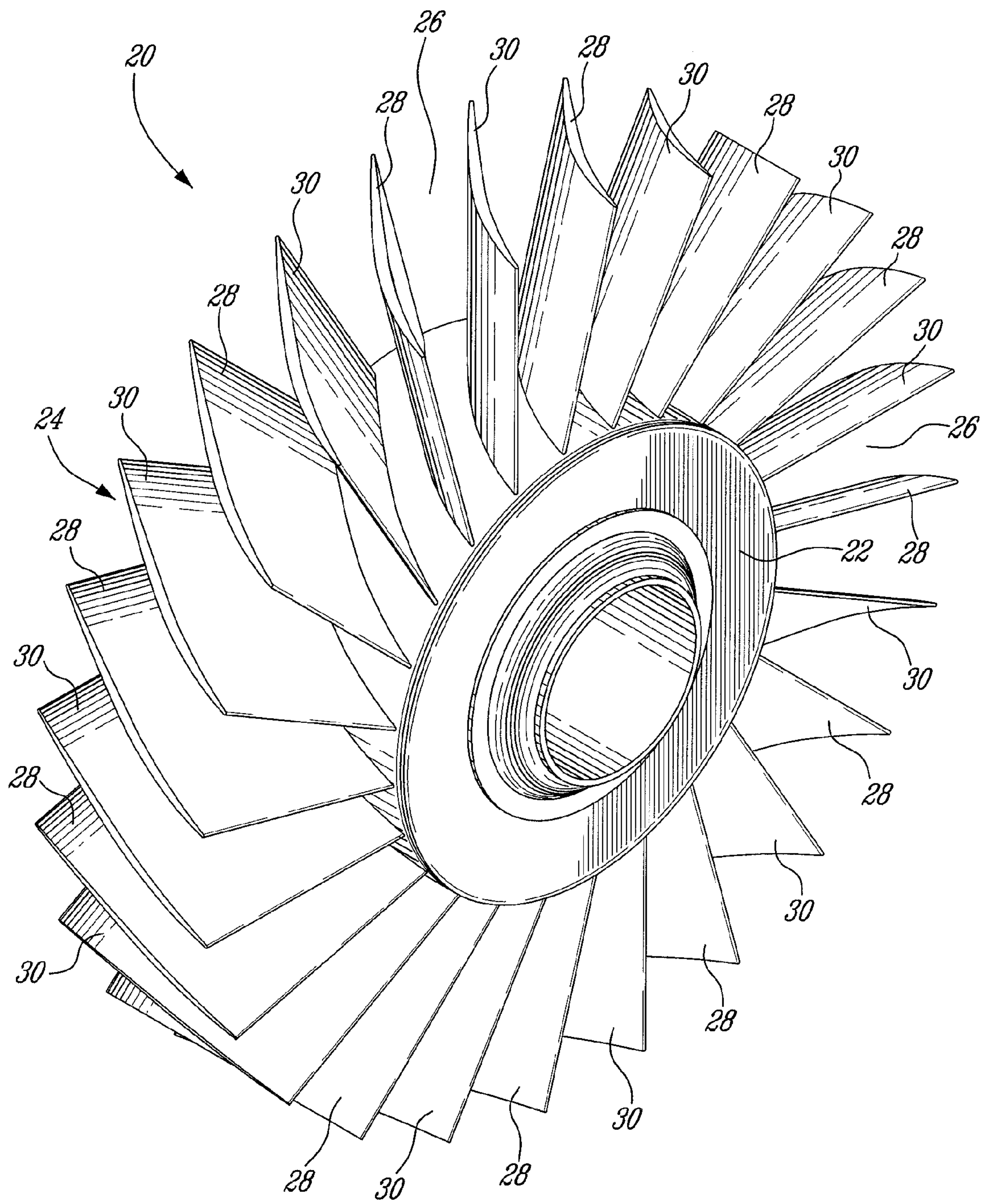
FIG. 2 is an isometric view of a frequency mistuned integrally bladed rotor (IBR) suited for use as a fan or compressor rotor of the gas turbine engine shown in FIG. 1.

FIG. 2 illustrates an integrally bladed rotor (IBR) 20 that could be used in the fan or compressor section of the engine 10 shown in FIG. 1. The IBR 20 has a hub 22 and a circumferential row of blades 24 extending integrally from the hub 22, the adjacent blades defining interblade passages 26 for the working fluid. The hub 22 and the blade row 24 can be flank milled or point milled from a same block of material.

The blade row 24 has an even number of blades and is composed of two groups of blades 28 and 30 which are designed to have different natural vibration frequencies in order to avoid flutter instability. The blades 28 and 30 are disposed in an alternate fashion around the hub 22. The difference in frequency between blades 28 and 30 results from the blades 28 and 30 having different airfoil geometries. More particularly, the blades 28 and 30 can be mistuned relative to one another by milling a different surface geometry in the pressure side 32 of blades 30. The differences between the airfoil geometries of blades 28 and 30 can be better illustrated by superposing an airfoil section of one of the first group of blades 28 over a corresponding airfoil section of one of the blades of the second group of blades 30, as for instance shown in FIG. 3.

Figure 3:
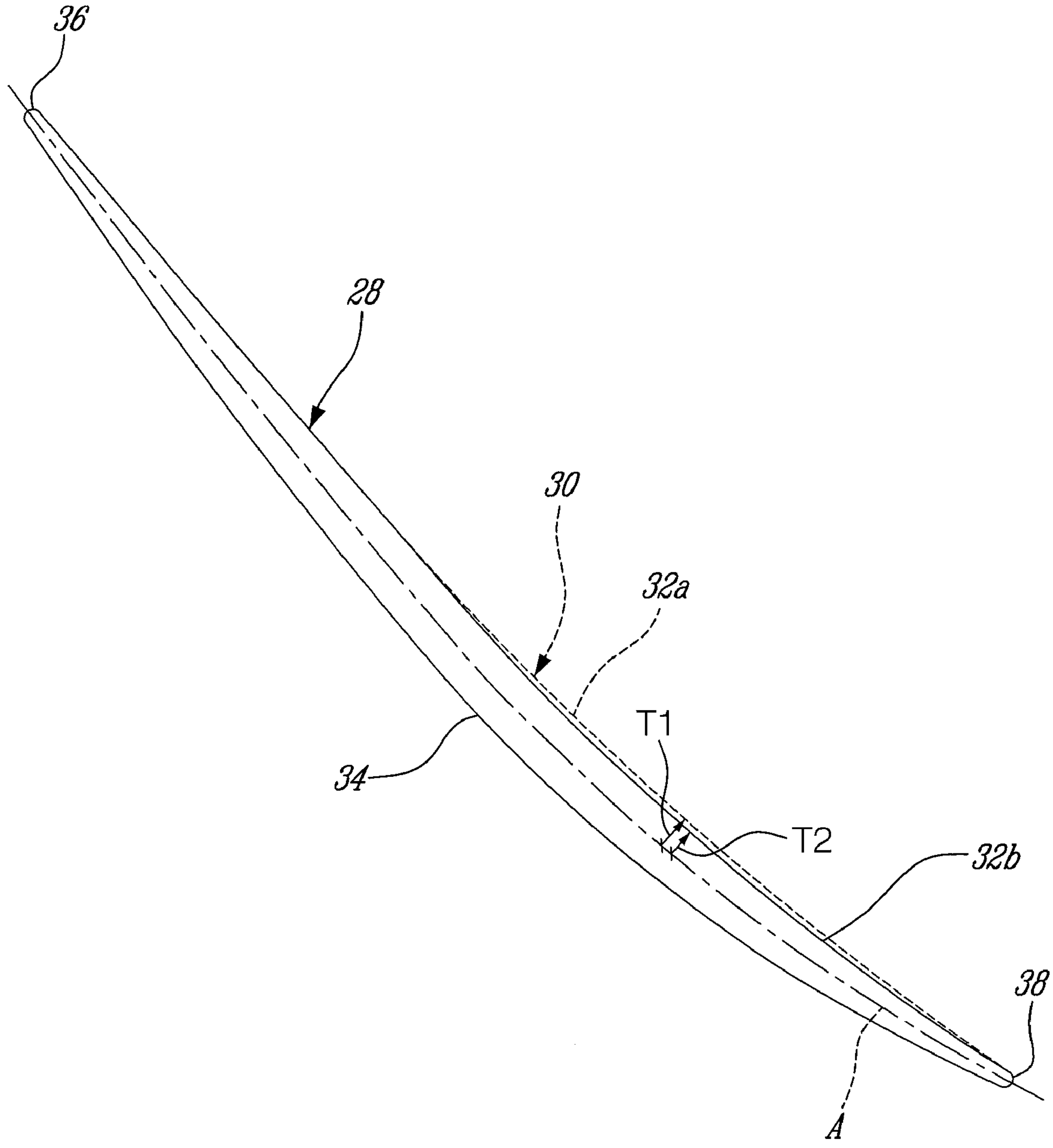
FIG. 3 is a cross-section view illustrating two distinct blade sections superposed one over the other to show the differences between the pressure side profiles thereof.

Referring to FIG. 3, it can seen that both groups of blades 28 and 30 have substantially the same suction surface 34, leading edge 36 and trailing edge 38 definitions (i.e. in the example the suction surface, the trailing edge and the leading edge contour or outline of the blades 28 and 30 coincide with each other when corresponding sections are superposed one over the other). The suction surface, leading edge and trailing edge definitions of the blades 28 and 30 are substantially identical along all of the length or span of the blades 28 and 30 (i.e. from the tip to the root of the blades). However, it can be appreciated that the pressure surface 32 of the blades 28 and 30 do not coincide along all the chord of the blades. The pressure surface 32*a* of blade 30 diverges from the pressure surface 32*b* of blade 28 at a location that can be anywhere from the leading edge to the trailing edge (in the illustrated example: slightly upstream from a mid-chord area of the blades relative to a flow direction of the working fluid). The pressure surface 32*a* of blade 30 is thicker than the pressure surface 32*b* of blade 28. The thickening is provided along the full length or span of the blades 30 that is from the root to the tip of the blades.

The thickness of the pressure surface 32 of the blades 28 and 30 can be defined by the distance of the pressure surface from a chord-wise median axis A of the blades. As can be appreciated from FIG. 3, the pressure surface thickness T1 of blade 30 is greater than the pressure surface thickness T2 of blade 28. The additional amount of material left on the pressure side 32 of the blade 30 is selected such that the natural frequency of blade 30 is different from the natural frequency of blades 28 by at least 3% up to 10%. One advantage of varying the pressure surface as opposed, for instance, to cropping the leading edge is to minimise the negative impact on the rotor performance. Cropping reduces the working surface area of the blade.

The thickening of the pressure side 32*a* of the blades 30 reduces the cross- section area of every other interblade passage 26 around the hub 22 of the IBR 20. Indeed, the flow passage area between the pressure surface 32*b* of a first one of the blades 28 and the suction surface 34 of the adjacent blade 30 is greater than the flow passage area of the pressure surface 32*a* of this adjacent blade 30 and the suction surface 34 of the next blade 28.

The intentional mistuning of the blades 28 and 30 provides passive flutter control by changing both mechanical and aerodynamic blade-to-blade energy transfer of the IBR during the full range of the gas turbine engine operation. The mistuning of blades 28 and 30 makes it more difficult for the blades to vibrate at the same frequency, thereby reducing flutter susceptibility. This provides for two different airfoil definitions incorporated into one component.

Thickening the pressure surface of the blades allows to effectively mistuning the blades of the IBR in order to avoid flutter instability and that without negatively affecting the aerodynamic efficiency of the IBR and still providing for easy manufacturing of the IBRs. This approach has also been found been found satisfactory from a structural point of view.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

What is claimed is:

1. An integrally bladed rotor (IBR) for a gas turbine engine, comprises a hub and a circumferential row of blades projecting integrally from said hub, the row including an even number of blades alternating between blades having first and second airfoil definitions around the hub, each blade having a pressure side and a suction side disposed on opposed sides of a median axis and extending between a trailing edge and a leading edge, the first and second airfoil definitions being different and having respective pressure side thicknesses T1 and T2 defined between respective median axes and respective pressure sides of the blades, the pressure side thickness T1 of the first airfoil definition being greater than the pressure side thickness T2 of the second airfoil definition.

2. The IBR defined in claim 1, wherein the first and second airfoil definitions have a same suction surface, leading edge and trailing edge profile but a different pressure surface profile.

3. The IBR defined in claim 1, wherein a first interblade passage defined between the pressure side of a first blade having the first airfoil definition and the suction side of an adjacent blade having the second airfoil definition has a smaller passage section than that of a second interblade passage defined between the pressure side of the adjacent blade and the suction side of a next blade having the first airfoil definition, thereby providing for alternate small and large interblade passages around the hub.

4. The IBR defined in claim 1, wherein the natural frequency of the blades having the pressure side thickness T1 differs from the natural frequency of the blades having the pressure side thickness T2 by at least 3% and up to 10%.

5. The IBR defined in claim 1, wherein the difference in thickness between T1 and T2 is provided over substantially the full span of the blades.

6. The IBR defined in claim 1, wherein the first airfoil definition is thicker than the second airfoil definition between the leading edge and the trailing edge of the blades.

7. A frequency mistuned integrally bladed rotor (IBR) for a gas turbine engine, comprising a hub and a circumferential row of blades of varying frequency projecting integrally from the hub, the row including an even number of blades, each blade in the row alternates with another blade having a different pressure surface definition but substantially identical suction surface, leading edge and trailing edge definitions.

8. The mistuned IBR defined in claim 7, wherein the circumferential row of blades includes a first group of blades and a second group of blades disposed in an alternating pattern around the hub, the blades of the first and second groups of blades having corresponding first and second blades sections over the full span of the blades, the corresponding first and second blades sections when superposed having coincident suction side, leading edge and trailing edge outlines but a different pressure side outline, the pressure side outline of the first blade section being offset outwardly from the corresponding pressure side outline of the second blade section along at least a chord-wise portion of the blades.

9. The mistuned IBR defined in claim 8, wherein the offset extends over substantially a full span of the blades.

10. The mistuned IBR defined in claim 8, wherein the offset between the pressure side outlines of the first and second corresponding blade sections is provided between the leading edge and the trailing edge of the blades.

11. The mistuned IBR defined in claim 8, wherein the blades of the first group of blades have a thicker pressure side than that of the blades of the second group of blades.

12. The mistuned IBR defined in claim 8, wherein the blades of the first group of blades have a natural frequency which differs from the natural frequency of the blades of the second group of blades by at least 3% and up to 10%.

13. A method of reducing vibration in an gas turbine engine integrally bladed rotor (IBR) having a circumferential row of blades extending integrally from a hub, the circumferential row of blades comprising an even number of blades; the method comprising varying the natural frequency of the blades around the hub in an alternate pattern by providing first and second distinct airfoil profiles around the hub, the first and second profiles having similar suction side, leading edge and trailing edge profiles but a different pressure side profile.

* * * * *